US006464390B1

(12) United States Patent
Baroche

(10) Patent No.: US 6,464,390 B1
(45) Date of Patent: Oct. 15, 2002

(54) MULTIFUNCTION WRIST WATCH WITH ELECTRONIC DEVICE

(76) Inventor: Jean-Michel Baroche, 15 Avenue Stephane Mallarme, Paris (FR), 75017

( * ) Notice: Subject to any disclaimer, the term of this patent is extended or adjusted under 35 U.S.C. 154(b) by 0 days.

(21) Appl. No.: 09/231,601

(22) Filed: Jan. 13, 1999

(30) Foreign Application Priority Data

Jul. 31, 1998 (FR) ............................................ 98 09833

(51) Int. Cl.[7] ........................ G04B 37/00; G04B 47/00; H04M 1/05

(52) U.S. Cl. ........................... 368/281; 368/10; 368/13; 368/47; 368/1; 368/4; 368/312; 368/313

(58) Field of Search .......................... 368/10, 276, 281, 368/282, 286, 311, 312, 313, 88, 283, 13, 69

(56) References Cited

U.S. PATENT DOCUMENTS 2,636,338 A * 4/1953 Dinstman .................... 368/283
4,072,004 A * 2/1978 Tanaka et al. ................ 368/69
4,183,206 A * 1/1980 Porsche et al. ............... 368/10
4,202,607 A 5/1980 Washizuka et al.
4,268,913 A * 5/1981 Nakagiri et al. .............. 368/10
4,444,513 A * 4/1984 Proellochs et al. ......... 368/276
4,470,708 A * 9/1984 Nee ........................... 368/276
4,525,077 A * 6/1985 Ketner ........................ 368/281
4,847,818 A * 7/1989 Olsen .......................... 368/10
4,964,093 A * 10/1990 Hiranuma et al. .......... 368/283
5,008,864 A * 4/1991 Yoshitake .................... 368/13
5,050,138 A * 9/1991 Yamada et al. ............... 368/10
5,235,561 A * 8/1993 Seager ........................ 368/10
5,262,763 A * 11/1993 Okuyama et al. ........... 368/276
5,467,324 A * 11/1995 Houlihan ..................... 368/10
5,471,438 A * 11/1995 Kabayashi et al. ........... 368/10
5,499,292 A * 3/1996 Blonder et al. ............... 368/10
5,508,978 A * 4/1996 Kalbermatter et al. ........ 368/10
5,819,183 A * 10/1998 Voroba et al. ................ 368/10
5,960,366 A * 9/1999 Duwaer ....................... 368/10
5,974,000 A * 10/1999 Pfeil .......................... 368/10

FOREIGN PATENT DOCUMENTS

EP 0 602 828 A1 6/1994
FR 2 719 027 10/1995
GB 2207262 * 1/1989 .................. 368/10
WO WO 93/16448 8/1993
WO WO 96/23373 8/1996

* cited by examiner

*Primary Examiner*—Diego Gutierrez
*Assistant Examiner*—Jeanne-Marguerite Goodwin

(57) ABSTRACT

A wristwatch with a usable dial, fitted with keys, includes an electronic device to form a multifunctional wrist worn device. The structure of the wristwatch is such that there is enough space to regularly actuate each key with a finger. The part of the multifunctional device providing the time can be shifted to free up the device's body. In particular, this device is characterized by the fact that the device's body, freed up in this way by the shift of the watch, contains, on its periphery, a number of keys that make it possible to easily actuate the electronic device with a finger. This simple device makes it possible to cover and to mask the electronic device's keys when the latter are not being used, the device according to the invention then having the general appearance of a wristwatch.

17 Claims, 4 Drawing Sheets

MULTIFUNCTION WRIST WATCH WITH ELECTRONIC DEVICE

CROSS-REFERENCE TO RELATED APPLICATIONS

This application claims the benefit of prior French Application No. 9809833, filed Jul. 31, 1998, the benefit of which is hereby claimed under 35 U.S.C. § 119.

FIELD OF THE INVENTION

The present invention is related to electronic devices worn on a user's wrist, more particularly, to wrist watches with an electronic communication device.

BACKGROUND INFORMATION

Given the present developments in the electronic industry, miniaturization is becoming more and more complete for devices such as the telephone and the services of links by radio-communication. So there is a trend toward developing multifunction objects that can be carried or worn by people, in particular wrist watches, which supplement their usual function with a supplementary function, using an electronic device.

The difficulty that we run into is then being able to have a usable dial, fitted with keys, the structure of which is such that we have enough space to regularly actuate each key with a finger.

SUMMARY

The purpose of this invention is to solve the problem of providing a wristwatch with a usable dial, fitted with keys, the structure of which is such that we have enough space to regularly actuate each key with a finger. On aspect of the present invention aims to constitute a multifunctional device, coming in the form of a wristwatch, the part providing the time being able to be shifted to free up the device's body. In particular, this device is characterized by the fact that the device's body, freed up in this way by the shift of the watch, contains, on its periphery, a number of keys that make it possible to easily actuate the electronic device with a finger. This simple device makes it possible to cover and to mask the electronic device's keys when the latter are not being used, the device according to the invention then having the general appearance of a wrist watch.

The shift of the part constituting the watch can be a flip which takes place, for example, spontaneously, under the effect of a spring. The freeing of the part constituting the watch being able to be done by any system, for example, a push-button which is located near the watch bracelet or strap on the device opposite a hinge that connects the part constituting the watch from the device's body. The spring makes it possible to flip open the device by pivoting the part constituting the watch from the device's body.

In compliance with the invention, thanks to the fact that the electronic control keys are arranged on the periphery of the lower body of the device, space is left at the center of the device to receive, for example, a box with a corresponding dimension. The box itself is fitted with a cover. The box can be used, among other purposes, as a pill box. This central space can also be used to contain an electronic device, possibly including a display screen. When the electronic device according to the invention is a mobile telephone, the central space also contains a miniaturized receiver and microphone.

In this way, with the device according to the invention, the dimensions of which are comparable to those of a conventional wrist watch, we can have, around the lower box, a sufficient number of keys, for example, ten or twelve, which can be easily actuated with the aid of a finger without risking uncertainty about the key actuated in this way. In accordance with this embodiment of the present invention, parts of the electronic device and/or the cell batteries or storage batteries can be installed in or on the strap or bracelet.

In accordance with another embodiment of the present invention, an electronic relay and its power supply can be installed in another location on the user's body, for example, in a pocket or on the belt. This embodiment, while using more energy, provides a more powerful means of wireless communication with the outside world. The electronic relay communicates with a wrist worn device similar to the wrist worn device described above. The relay can communicate with the wrist worn device with or without a wire connection to the wrist worn device. Also, the main energy storage battery can be carried more easily than if it were integrated with the device worn on the wrist.

BRIEF DESCRIPTION OF THE DRAWINGS

The foregoing aspects and many of the attendant advantages of this invention will become more readily appreciated by reference to the following detailed description, when taken in conjunction with the accompanying drawings listed below.

DETAILED DESCRIPTION

Figure 1:
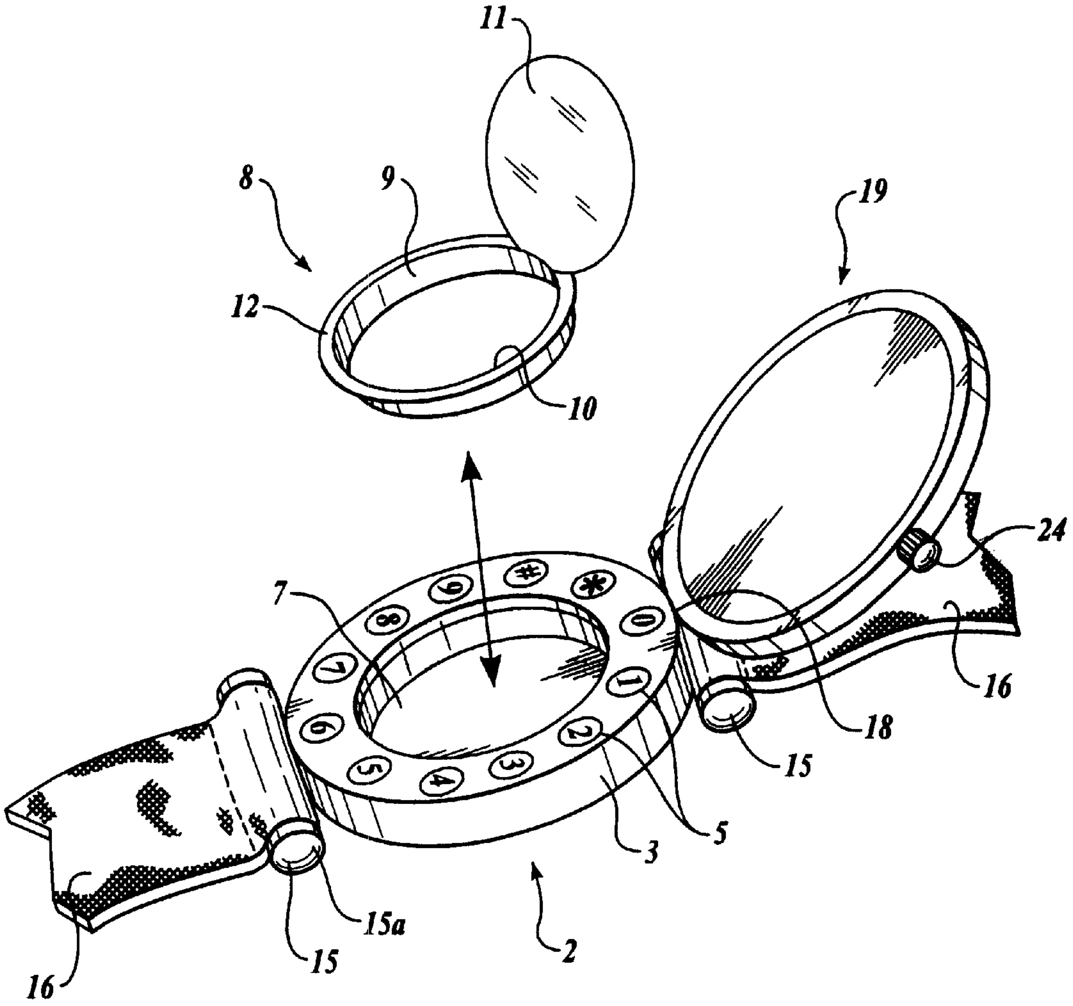
FIG. 1 is a perspective view of a first version of the device according to the invention in open position.

FIG. 1 shows a perspective diagram of a first version of the invention which has a main body 1, fitted at the two extremities with a strap or bracelet 2, which makes it possible to wear the inventive device on the wrist as one does with a wrist-watch. A box 3, articulated at hinge 4 on body 1, is fitted with a conventional watch, the dial of which is located on its face opposite the device's body.

On the periphery of the body 1, are located keys 6, numbered in this embodiment as "0" to "9", along with a double dagger (or pound sign) and a star (or asterix). The keys 6 are used in the normal manner to operate an electronic device that is contained in the body 1. This electronic device can consist, for example, of a calculator, a telephone or any other means of radio-communication. In light of the present disclosure, those skilled in the art can adapt a miniature telephone to fit within body 1, with keys 6 arranged along the periphery of body 1. The configuration of the keys 6 allows the user to operate the electronic device that is contained in the body 1 while being worn on the user's wrist. Alternatively, the electronic device may be contained in body 1 and/or partially in the bracelet 2 or in the box 3 that contains the watch.

The box 3, which contains the watch, can advantageously be pushed back into the open position, shown on FIG. 1 in the usual position, by using a spring which is found at hinge 4.

Figure 2:
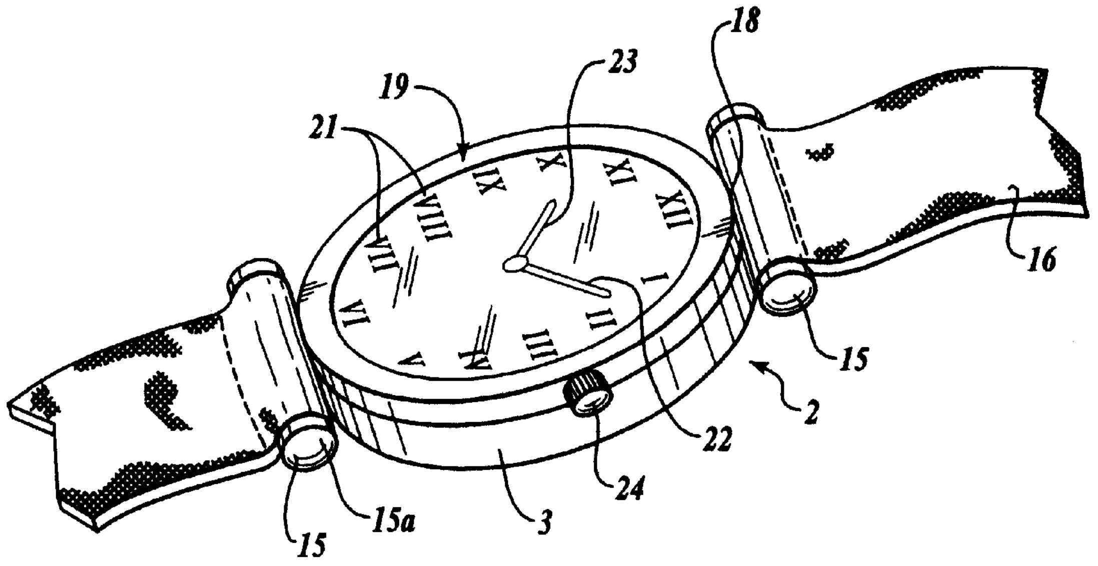
FIG. 2 is a perspective view, corresponding to FIG. 1, in closed position.

FIG. 2 shows the device in the closed position. In closed position, the box 3 is held against the body 1 by some mechanism, for example, a catch, which can be freed by the action of a finger against the watch's box or by pressing laterally on a bar 7 which connects the body 1 to the strap or bracelet 2.

Figure 3:
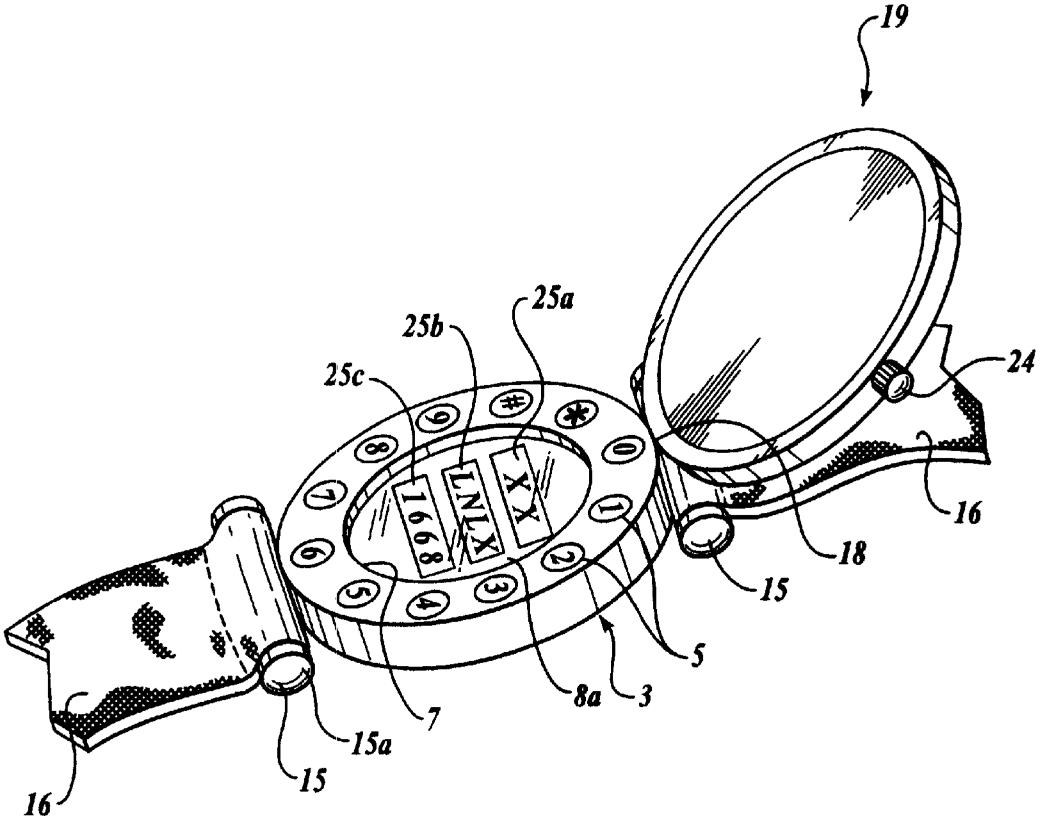
FIG. 3 is a perspective view of a pill box which might be installed in the central cavity of the body of the device in FIG. 1.

In the version shown on FIG. 1, the central space of body 1 is left free which makes it possible to position there, if so desired, a box of the corresponding shape, as shown on FIG. 3. This box itself includes a body 8, fitted with a flange 9 that bears against the top of body 1, and a cover 10 which protects the box's content when the keys are being used.

Figure 4:
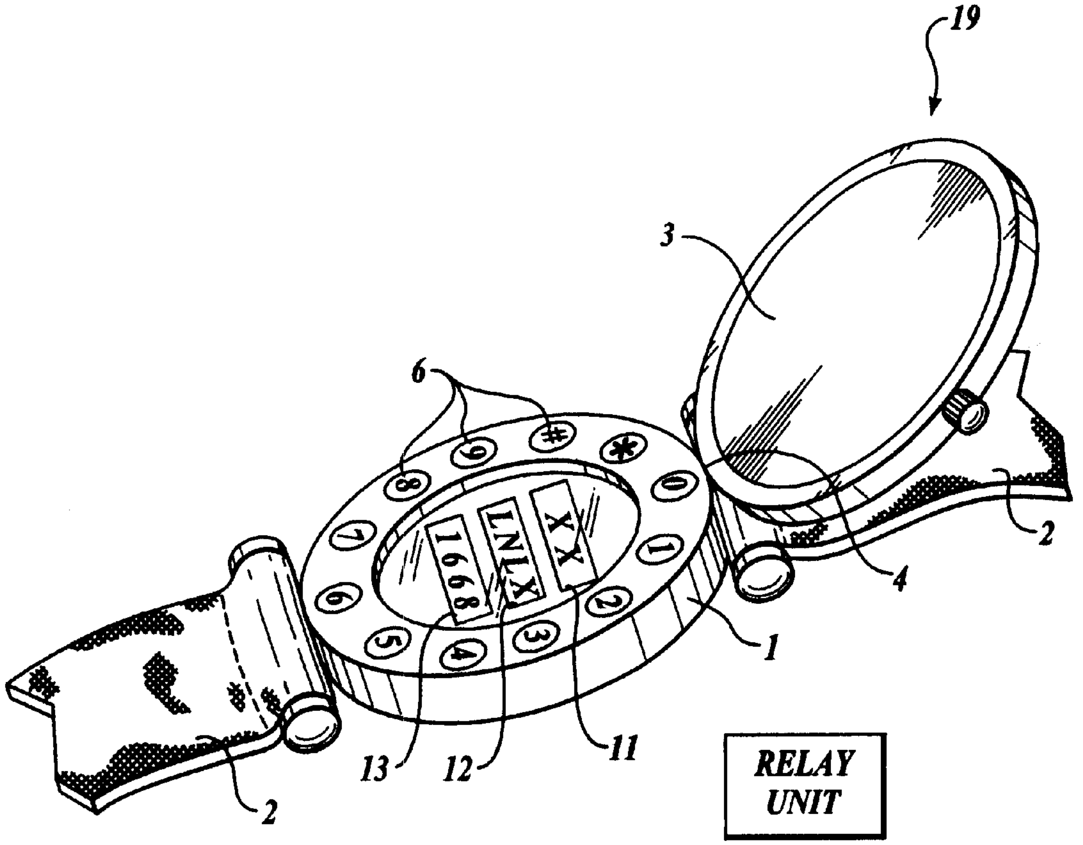
FIG. 4 is a perspective view of a second version of the invention in which the central cavity of the device's body is occupied by an electronic device, containing display zones.

FIG. 4 is a variant of FIGS. 1, 2 and 3 in which the central space of body 1 is occupied by an electronic device, which, in the version described, contains three display zones 11, 12 and 13.

Naturally, the versions that are described above have no particular design limits and they may receive all desirable modifications without, for that purpose, abandoning the framework of the invention.

In accordance with the present invention, a part of the electronic device and/or the cell batteries or storage batteries can be installed in or on the strap or bracelet 2.

In accordance with another embodiment of the invention, an electronic relay unit and its power supply can be installed in another location on the user's-body, for example, in a pocket or on a belt to be worn by the user. The relay unit, which drains more energy, provides telecommunication functions with the outside world (e.g., an outside telephone network) and provides a transmission link (with or without a wire connection) to the device according to the invention described above in conjunction with FIGS. 1–4. For example, the electronic device can be a wireless transceiver unit that is configured to communicate with the relay unit, which in turn is used to communicate with a cellular telephone network. The relay unit is equivalent in function to a wireless telephone configured with a remote "handset" (i.e., microphone and speaker) fitted into the body 1. Another advantage of this embodiment is that the main energy storage battery can also be carried more easily than if it were integrated with the device worn on the wrist.

The embodiments of the wrist watch/electronic device described above are illustrative of the principles of the present invention and are not intended to limit the invention to the particular embodiments described. For example, those skilled in the art, in light of this disclosure, can implement, without undue experimentation, other configurations of this invention. For example, one configuration may have the watch in the body 1 of the device and the keys 6 in the upper face or the lower face of the box that is articulated on the body 1. Alternatively, the box 3 can be shifted by sliding instead of by flipping with relation to the body. Accordingly, while the preferred embodiment of the invention has been illustrated and described, it will be appreciated that various changes can be made therein without departing from the spirit and scope of the invention.

I claim:

1. A multifunctional device that comes in the form of a wristwatch, comprising:

a body having a central portion and a periphery;

a plurality of keys located on the periphery of the body, wherein the central portion is left uncovered by keys;

an electronic device located within the central portion of the body and operated by actuating one or more of the plurality of keys, the electronic device being further configured for wireless communication with a relay unit, the relay unit being located on a user and separate from the electronic device, the relay unit being further configured for wireless communication with an external telephone system; and a watch part coupled to the body.

2. The device according to claim 1, wherein the watch part is shifted from the body by pivoting the watch part about a point of the body.

3. The device according to claim 1, wherein the watch part is contained in a box.

4. The device according to claim 3, wherein the box includes a cover.

5. The device according to claim 1 further including a hinge coupling the watch part to the body, wherein the watch part can be selectably shifted from the body.

6. The device according to claim 1, wherein the central portion of the body includes a central space.

7. The device according to claim 6, further comprising a box sized to fit within the central space.

8. The device according to claim 6, wherein the central space is configured to hold the electronic device.

9. The device according to claim 1, wherein the electronic device includes a display screen.

10. The device according to claim 1, wherein the watch part covers the plurality of keys when the watch part is not shifted from the body.

11. The device according to claim 10, wherein the watch part is shifted away to expose the plurality of keys.

12. The device according to claim 1, wherein the electronic device includes a receiver, a speaker and a microphone, the electronic device being configured with a wireless telephone function.

13. The device according to claim 1 wherein the plurality of keys include twelve keys arranged to correspond to clock positions for the watch part.

14. A multifunctional device in the form of a wristwatch, the device comprising:

a body having a central portion and a periphery;

a band connected to the body;

a plurality of keys located on the periphery of the body, wherein the central portion is left uncovered by keys;

an electronic device located within the central portion of the body and configured to be operated by actuating one or more keys of the plurality of keys, the electronic device being further configured for wireless communication with a relay unit, the relay unit being located on a user and separate from the electronic device, the relay unit being further configured for wireless communication with an external telephone system; and a watch disposed to cover the electronic device.

15. The device of claim 14 wherein the plurality of keys include twelve keys arranged to correspond to clock positions for the watch.

16. The device of claim 14 wherein the watch is pivotally attached to the body.

17. The device of claim 16 wherein the electronic device includes a display screen that is selectably exposed by pivoting the watch about a point on the body.

* * * * *